(12) United States Patent
Ikeda

(10) Patent No.: US 8,890,980 B2
(45) Date of Patent: Nov. 18, 2014

(54) IMAGING APPARATUS AND ZOOM LENS WITH ADJUSTABLE STOP POSITIONS

(71) Applicant: Panasonic Corporation, Osaka (JP)

(72) Inventor: Takahiro Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 121 days.

(21) Appl. No.: 13/792,328

(22) Filed: Mar. 11, 2013

(65) Prior Publication Data
US 2013/0242168 A1 Sep. 19, 2013

(30) Foreign Application Priority Data

Mar. 14, 2012 (JP) ................. 2012-057015

(51) Int. Cl.
H04N 5/262 (2006.01)
H04N 5/232 (2006.01)
(52) U.S. Cl.
CPC ............... H04N 5/23296 (2013.01)
USPC .................................. 348/240.99
(58) Field of Classification Search
CPC ..... H04N 5/217; H04N 5/335; H04N 5/3572; H04N 5/23296; H04N 5/2628
USPC ......................... 348/240.99–240.3
See application file for complete search history.

(56) References Cited

U.S. PATENT DOCUMENTS

| 8,111,949 B2* | 2/2012 | Sakurai .......................... 382/299 |
| 2002/0051301 A1* | 5/2002 | Noguchi et al. .............. 359/689 |
| 2009/0284647 A1* | 11/2009 | Yanai et al. ................... 348/371 |
| 2010/0245629 A1* | 9/2010 | Nanba et al. ............... 348/240.1 |
| 2011/0157487 A1* | 6/2011 | Akeyama ...................... 348/759 |
| 2012/0188410 A1* | 7/2012 | Obata ........................... 348/239 |

FOREIGN PATENT DOCUMENTS

| JP | 02-068507 | 3/1990 |
| JP | 2006-180253 | 7/2006 |
| JP | 2006-229690 | 8/2006 |

* cited by examiner

Primary Examiner — Aung S Moe
Assistant Examiner — Amy Hsu
(74) Attorney, Agent, or Firm — Panasonic Patent Center

(57) ABSTRACT

An imaging apparatus includes a zoom lens, an operation unit that receives an operation for changing a magnification of the zoom lens, an imaging unit that generates image data based on a subject image formed via the zoom lens, a driver that moves the zoom lens stepwise to one of predetermined stop positions corresponding to each of a plurality steps according to the operation received by the operation unit, and a controller that controls the driver. The controller changes the stop position of the zoom lens at each step according to a size of a region of the imaging unit on which the image data is generated so that a converted focal length at the stop position of the zoom lens at each step is the same regardless of the size of the region.

10 Claims, 8 Drawing Sheets

IMAGING APPARATUS AND ZOOM LENS WITH ADJUSTABLE STOP POSITIONS

BACKGROUND

1. Technical Field

The present disclosure relates to an imaging apparatus which electrically drives a zoom lens.

2. Related Art

Conventional imaging apparatuses have an electromotive zoom which include two modes of "continuous zoom mode" and "step zoom mode" (for example, see JP2-68507A). In the "continuous zoom mode", the imaging apparatus continuously drives the zoom lens while a user of the imaging apparatus keeps operating an operation switch, and the imaging apparatus stops the zoom lens at the position where the user stops the operation. In the "step zoom mode", the imaging apparatus can stop the zoom lens at any of zoom focal lengths predefined to allow a user to shoot at any of predetermined magnifications.

SUMMARY

An imaging apparatus can allow the user to change the aspect ratio of the image before shooting an image so that the user can shoot an image appropriate for user's viewing on a television with aspect ratio of 16:9 or on a television with aspect ratio of 4:3.

In displaying the zoom focal length, the imaging apparatuses having electromotive zoom may adopt a measure to indicate the focal length with the actual focal length (actual focal length system) or a measure to indicate the focal length with the actual focal length converted into 35-mm size film which is generally taken as a standard (35-mm film equivalent focal length system).

On the other hand, an image may be shot by the imaging apparatus with the aspect ratio of 4:3 or with the aspect ratio of 16:9. In some settings of an imaging region on an imaging device, a coefficient for calculating the 35 mm equivalent focal length may differ depending on the aspect ratio of the image.

Here, it is considered that a display device of the imaging apparatus displays the 35 mm equivalent focal length when displaying the focal lengths at which the zoom lens can be stopped, in the step zoom mode. Between the cases where the image is to be shot as the image with the aspect ratio of 4:3 and where the image is to be shot as the image with the aspect ratio of 16:9, the 35 mm equivalent focal length at which the zoom lens can be stopped differs from each other, even though the actual focal lengths are the same. This may confuse the user of the imaging apparatus in setting the magnification.

The present disclosure provides an imaging apparatus capable of changing the angle of view of the captured image stepwise, thereby improving user convenience.

A first imaging apparatus according to the present disclosure includes a zoom lens, an operation unit that receives an operation for changing a magnification of the zoom lens, an imaging unit that generates image data based on a subject image formed via the zoom lens, a driver that moves the zoom lens stepwise to one of predetermined stop positions corresponding to each of a plurality steps according to the operation received by the operation unit, and a controller that controls the driver. The controller changes the stop position of the zoom lens at each step according to a size of a region of the imaging unit on which the image data is generated so that a converted focal length at the stop position of the zoom lens at each step is the same regardless of the size of the region. The converted focal length is a focal length of the zoom lens obtained by converting an actual focal length of the zoom lens based on a predetermined basis.

A second imaging apparatus according to the present disclosure includes a zoom lens, an operation unit that receives an operation for changing a magnification of the zoom lens, an imaging unit that generates image data based on a subject image formed via the zoom lens, a driver that moves the zoom lens stepwise to one of predetermined stop positions corresponding to each of a plurality of steps according to the operation received by the operation unit, and a controller that controls the driver. The controller has a first shooting mode and a second shooting mode in which the size of a region of the imaging unit on which the image data is generated differs from that of the first shooting mode. The controller changes the stop position of the zoom lens at each step according to the shooting mode so that a converted focal length at the stop position of the zoom lens at each step is the same regardless of the shooting mode. The converted focal length is a focal length of the zoom lens which is obtained by converting an actual focal length of the zoom lens based on a predetermined basis.

A third apparatus according to the present disclosure includes an input portion receiving user input instructions for performing a zoom operation and setting the imaging apparatus to one of first and second operating modes, the first and second operating modes having different region sizes of an imaging unit on which image data is generated, a controller electrically coupled to the input portion, and a memory electrically coupled to the controller. The memory includes first zoom lens stop positions associated with the first operating mode and second zoom lens stop positions associated with the second operating mode. The first zoom lens stop positions and the second zoom lens stop positions are defined to be equivalent to a predetermined standard. The memory further includes instructions for configuring the controller to generate drive signals for driving a zoom lens to one of the first and second zoom lens stop positions based upon which of the first and second operating modes the imaging apparatus is set.

The imaging apparatus according to the present disclosure enables an improvement in the convenience of the user of the imaging apparatus capable of changing the angle of view of the captured image stepwise. In particular, the imaging apparatus can suppress change in angle of view at each step of the angle of view which is caused by change in shooting settings or shooting mode.

DETAILED DESCRIPTION OF PREFERRED EMBODIMENTS

Embodiments will be described below with reference to the drawings as necessary. A digital camera will be exemplified as an example of embodiments.

In the description of the present disclosure, certain unnecessary portions regarding, for example, conventional technology, redundant description on substantially the same configuration may be omitted for ease of description.

The following description and the attached drawings are disclosed to enable those skilled in the art to sufficiently understand the present disclosure, and are not intended to limit the subject matter of the claims.

1. Configuration 1-1. Overview of Configuration

An overview of a configuration of a digital camera according to the present embodiment will be described.

Figure 1A:
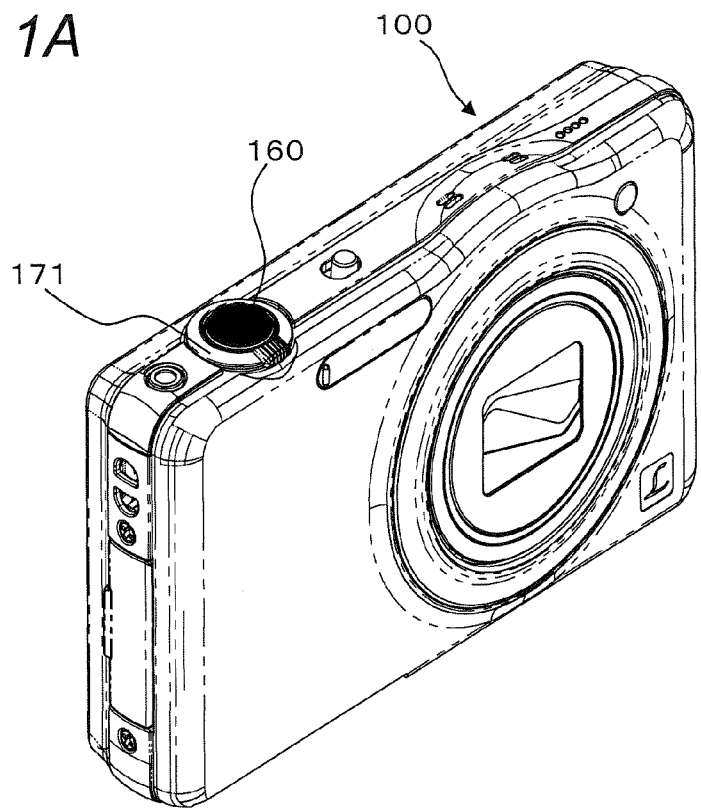
FIG. 1A is a first perspective view of a digital camera according to the present embodiment.
Figure 1B:
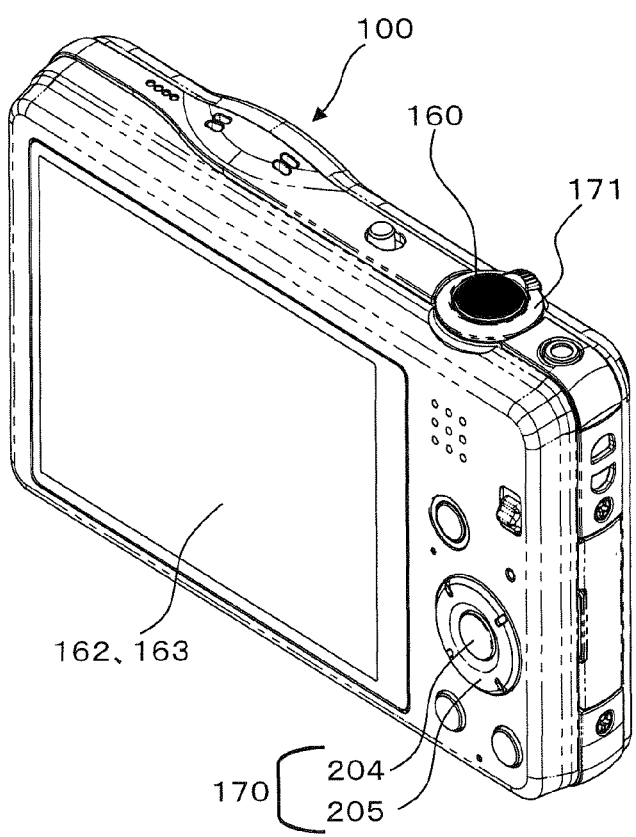
FIG. 1B is a second perspective view of the digital camera according to the present embodiment.

FIGS. 1A and 1B are perspective views of the digital camera according to the present embodiment. As illustrated in FIGS. 1A and 1B, a digital camera 100 has a zoom lever 171. When the zoom lever 171 is operated, a camera controller of the digital camera 100 controls a zoom lens.

The digital camera 100 also has a release button 160. When receiving an operation by a user on the release button 160, the digital camera 100 can perform operations such as an autofocus operation and a shooting operation on a subject image, according to the user's operation.

The digital camera 100 has a liquid crystal display monitor 163, a touch panel 162, a camera operation unit 170 including a center button 204 and a directional button 205, and the like on the rear. In response to an operation by a user on the touch panel 162 or the camera operation unit 170, the digital camera 100 can perform various controls according to the user's operation.

1-2. Configuration of Respective Units of Digital Camera

Figure 2:
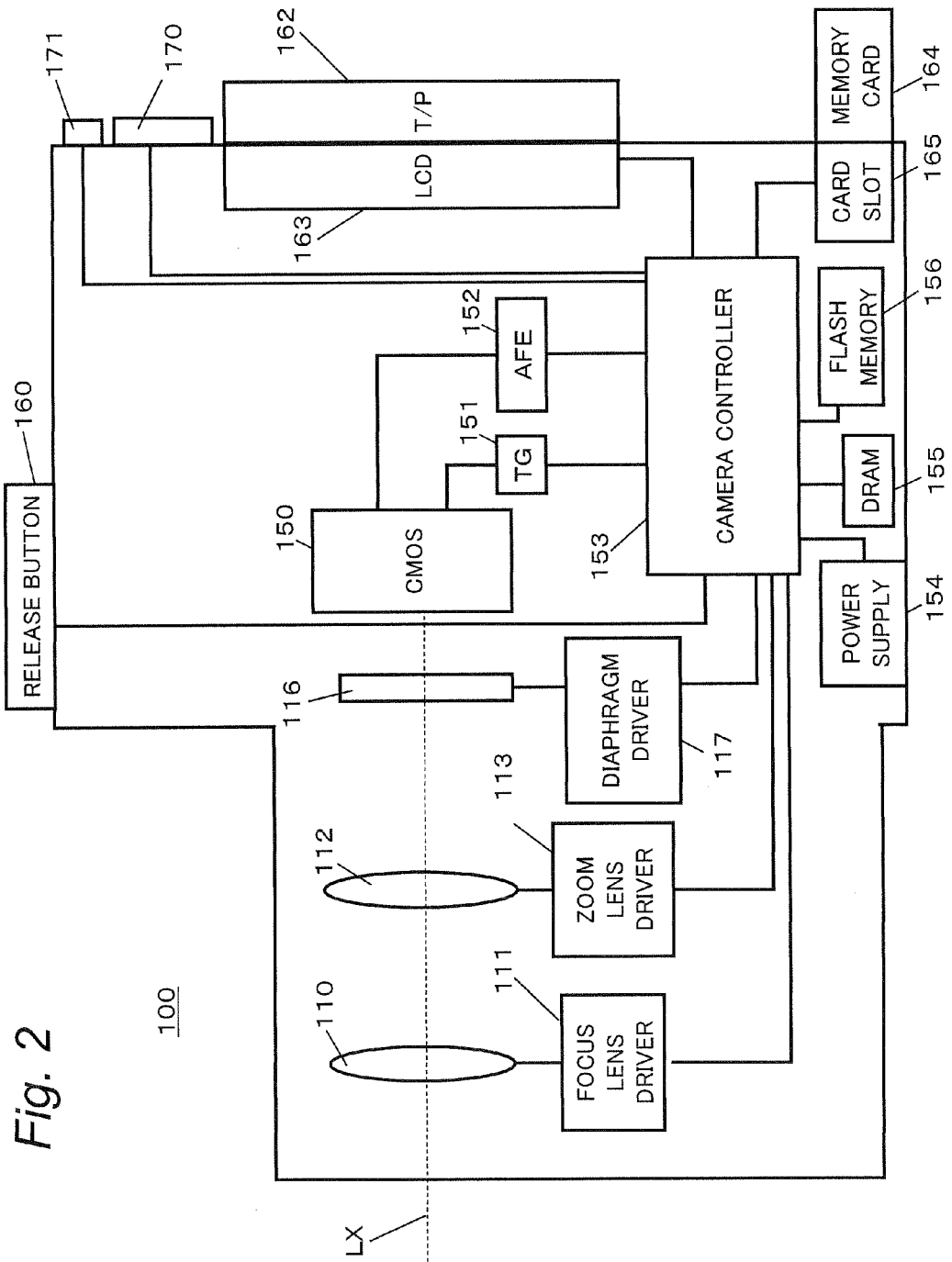
FIG. 2 is a diagram illustrating an electrical configuration of the digital camera according to the present embodiment.

FIG. 2 is a diagram illustrating an electrical configuration of the digital camera 100. The configuration of the digital camera 100 will be described in detail below.

The digital camera 100 has an optical system including a focus lens 110 and a zoom lens 112, a focus lens driver 111, a zoom lens driver 113, a diaphragm 116, a diaphragm driver 117, a camera controller 153, a CMOS image sensor 150, a timing generator 151 (hereinafter, referred to as "TG" 151), an analog front end 152 (hereinafter, referred to as "AFE" 152), a liquid crystal display monitor 163, a touch panel 162, a release button 160, a camera operation unit 170, a zoom lever 171, a power supply 154, a DRAM 155, a flash memory 156, a card slot 165, a memory card 164, and the like.

According to instructions from operation members of the digital camera such as the release button 160, the camera operation unit 170, and the zoom lever 171, the camera controller 153 controls the portions of the digital camera 100 including the CMOS image sensor 150, the zoom lens 112, and so on. The camera controller 153 sends a vertical synchronizing signal to the TG 151. In parallel to that process, the camera controller 153 generates an exposure synchronizing signal based on the vertical synchronizing signal. The camera controller 153 also sends a control signal to the zoom lens driver 113 to cause the zoom lens driver 113 to drive the zoom lens 112. The camera controller 153, which is connected to the DRAM 155 and the flash memory 156, can write/read information to/from the DRAM 155 and/or the flash memory 156 as required. The camera controller 153 may be implemented with a hardwired electronic circuit, a microcomputer with a program, or the like.

The DRAM 155 is used as a work memory by the camera controller 153 for various controls.

The flash memory 156 stores a program, parameters, and the like used by the camera controller 153 for various controls. The parameters include information indicating the aspect ratio of an image for the digital camera 100 to capture the image, and information regarding a set of stop positions of the zoom lens 112 according to the aspect ratio for the digital camera 100 to perform a step zoom operation. The details of the set of stop positions of the zoom lens will be described later.

The focus lens 110 is a lens for changing the focus state of a subject image incident on the optical system of the digital camera 100 and formed on the CMOS image sensor 150. The focus lens 110 may be composed of any number of lens(es) or any number of group(s) of lenses.

Based on the control signal sent from the camera controller 153, the focus lens driver 111 drives the focus lens 110 to move along the optical axis LX of the optical system. Note that the focus lens driver 111 may be implemented with a stepping motor, a DC motor, an ultrasonic motor, or the like for example.

The zoom lens 112 is a lens for changing the magnification of a subject image formed on the optical system of the digital camera 100. The zoom lens 112 may be composed of any number of lens (es) or any number of group (s) of lenses.

Based on the control signal sent from the camera controller 153, the zoom lens driver 113 drives the zoom lens 112 to move along the optical axis LX of the optical system. Note that the zoom lens driver 113 may be implemented with a stepping motor, a DC motor, an ultrasonic motor, or the like for example.

The diaphragm 116 includes mechanical blades openable and closable. The diaphragm 116 is an amount of light adjusting member for adjusting the amount of light incident on the CMOS image sensor 150 of the digital camera 100.

Based on the control signal sent from the camera controller 153, the diaphragm driver 117 drives the diaphragm 116 to change the open/close state of the mechanical blades of the diaphragm 116. Note that the diaphragm driver 117 may be implemented with a stepping motor, a DC motor, an ultrasonic motor, or the like for example.

The CMOS image sensor 150 operates at the timing controlled by the TG 151. The operation of the CMOS image sensor 150 under the control of the TG 151 includes capturing of a still image, capturing of a "through image", data transferring, an electronic shutter operation, and the like. The "through image", a moving image in the main, is displayed on the liquid crystal display monitor 163 for the user to refer to the composition of the still image to shoot.

The liquid crystal display monitor 163 is a display unit placed on the rear of the digital camera 100 and displays the image indicated by the display image information processed by the camera controller 153. The liquid crystal display monitor 163 can selectively display the image and the still image. Further, the liquid crystal display monitor 163 can display the setting, the conditions, and the like of the digital camera 100 in addition to the image. Although the liquid crystal display monitor 163 is described as an example of the display unit in the embodiment, the display unit is not limited only to such a configuration. For example, a display unit such as an organic electroluminescence EL display or the like may be used in place of the liquid crystal display monitor 163.

The touch panel 162 is provided on the surface of the liquid crystal display monitor 163. The touch panel 162 generates information on the position on the touch panel 162 in which the user of the digital camera 100 touches. The touch panel 162 calculates the position coordinate on the touch panel in which the user touches based on the information on the position in which the user touches and sends the position coordinate to the camera controller 153.

The power supply 154 supplies power required to the operation of the digital camera 100. The power supply 154 may be a dry battery or a rechargeable battery for example. The power supply 154 may also be configured to supply power supplied from outside through a power cord to the digital camera 100. When the power of the digital camera 100 is switched ON by the user, the camera controller 153 can supply power to the respective units of the digital camera 100.

The card slot 165 is a connection unit for storing the memory card 164. The card slot 165 can electrically and mechanically connect to the memory card 164. The card slot 165 may have a function for controlling the memory card 164.

The memory card 164 is an external memory provided with a storage unit such as a flash memory therein. The memory card 164 can store data including image information processed by the camera controller 153. The memory card 164 can also output the data including the image information stored therein. The image information output from the memory card 164 is processed by the camera controller 153 and displayed, for example, on the liquid crystal display monitor 163.

The release button 160 receives an operation from the user of the digital camera 100. The release button 160 receives a two-stage operation of a half-press stage and a full-press stage. When the user half-presses the release button 160, the camera controller 153 drives the focus lens 110 to perform the autofocus operation. Further, when the user full-presses the release button 160, the camera controller 153, at the moment of the full-press operation, stores the image information generated by the CMOS image sensor 150 into the memory card 164. Note that, when the memory card 164 is not inserted into the card slot 165, the image information may be stored in the flash memory 156.

The camera operation unit 170 includes the operation members such as the center button 204 and directional button 205 as described above. The camera operation unit 170 also includes a switch for switching the continuous zoom mode/the step zoom mode and a switch for changing the aspect ratio of the captured image. Details of the "continuous zoom mode" and the "step zoom mode" will be described later. When the camera operation unit 170 receives operations from the user of the digital camera 100, the camera controller 153 performs various controls according to the user's operations. For example, when the user operates the switch for changing the aspect ratio of the captured image, the aspect ratio is changed according to the user's operation and information on the aspect ratio after the change is stored in the flash memory 156.

The zoom lever 171 is the operation member with three poles. When receiving an operation from the user of the digital camera 100, the zoom lever 171 sends a control signal to the zoom lens driver 113 to cause the zoom lens driver 113 to drive the zoom lens 112 according to the operated direction of the zoom lever 171.

1-3. Image Capturing Area of CMOS Image Sensor

An image capturing range (image capturing area) of the CMOS image sensor 150 will be described below.

The CMOS image sensor 150 according to the present embodiment has pixels arrayed on a plane. Each of the pixels converts the light passed through the optical system into an electric signal to output the signal to the APE 152.

Hereinafter, the range (area) of pixels including the pixels which can receive light and convert the light into an electric signal will be referred to as "effective pixel area". Further, the range (area) of pixels for retrieving the signals for generating the captured image out of the "effective pixel area" will be referred to as "image capturing range (image capturing area)".

As described above, the digital camera 100 according to the present embodiment can capture an image with an aspect ratio set by the user. For example, the image with the aspect ratio of 4:3 or 16:9 can be captured.

The CMOS image sensor 150 changes the size of the image capturing area according to the set aspect ratio.

Figure 3A:
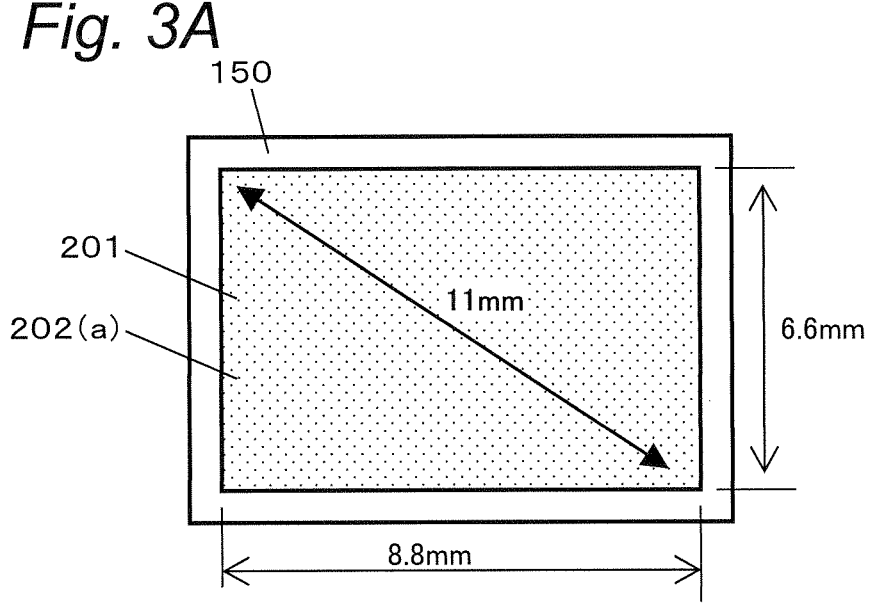
FIG. 3A is a first diagram illustrating an image capturing range of a CMOS image sensor in the digital camera according to the present embodiment.
Figure 3B:
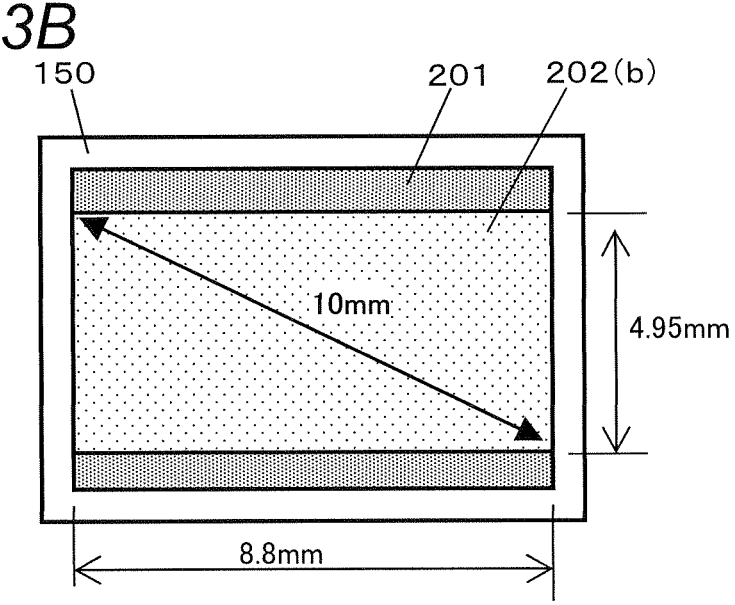
FIG. 3B is a second diagram illustrating an image capturing range of the CMOS image sensor in the digital camera according to the present embodiment.

FIGS. 3A and 3B are diagrams illustrating the image capturing area of the CMOS image sensor 150 incorporated in the digital camera 100. FIGS. 3A and 3B illustrate a 1/2.3 inch sized CMOS image sensor 150 with the aspect ratio of 4:3 as an example.

When an image is captured with the aspect ratio of 4:3 by the 1/2.3 inch sized CMOS image sensor 150 according to the present embodiment, as illustrated in FIG. 3A, the entire range of the effective pixel area 201 is used as an image capturing area 202 (*a*) for capturing an image. In that case, the length of the diagonal of the image capturing area 202 (*a*) is 11 mm.

On the other hand, when an image is captured with the aspect ratio of 16:9, as illustrated in FIG. 3B, an image capturing area 202 (*b*) is used which is the effective pixel area 201 with the upper and lower parts unused. In that case, the length of the diagonal is 10 mm, which is shorter than that of the case with the aspect ratio of 4:3.

As such, the digital camera 100 according to the present embodiment changes the size of the image capturing area on the CMOS image sensor 150 for capturing an image (and accordingly, the length of the diagonal of the image capturing area) depending on setting of the aspect ratio of the image to be captured.

Note that, although the sensor size of the CMOS image sensor 150 is described as 1/2.3 inch size in the present embodiment, the sensor size may be at any size such as 1/2.5 inch, APS-C size, or full size.

1-4. Zoom Operation

Figure 4:
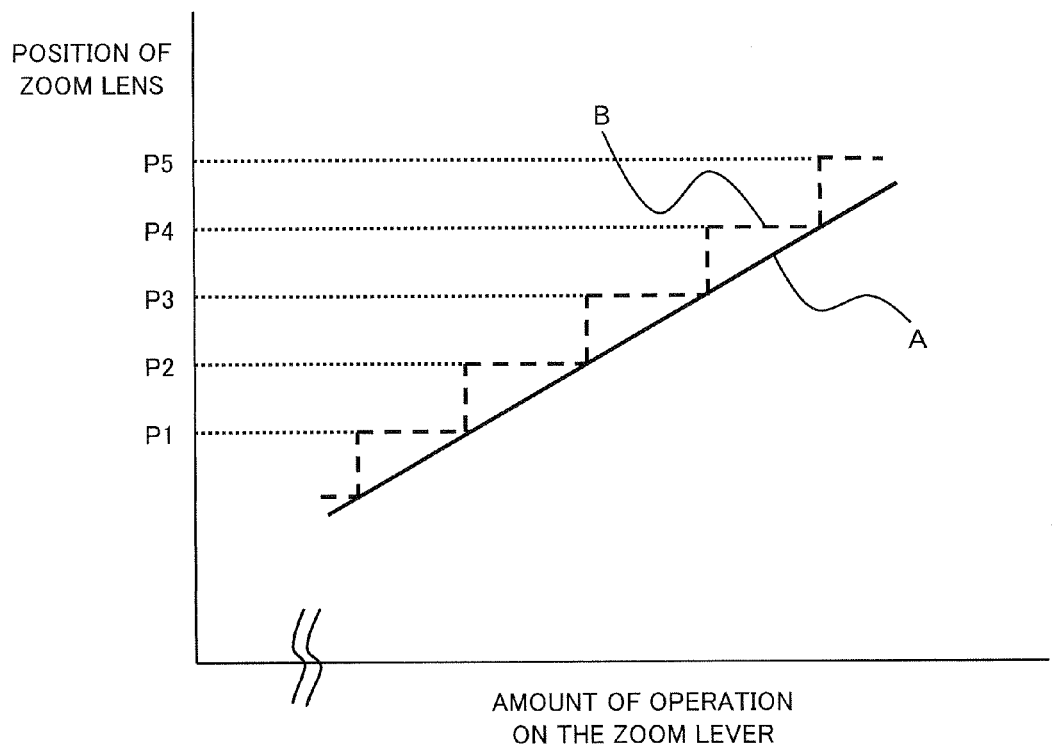
FIG. 4 is a diagram for describing a step zoom operation according to the present embodiment.

The zoom operations of the digital camera 100 according to the present embodiment will be described below. FIG. 4 is a diagram for describing the continuous zoom operation and the step zoom operation according to the present embodiment.

As described above, the digital camera 100 has two modes of zoom operation, i.e., the "continuous zoom mode" and the "step zoom mode".

In the continuous zoom mode, the position of the zoom lens 112 is continuously changed according to the user's operation on the zoom lever 171 or the like as denoted by the solid line A of FIG. 4.

In contrast, in the step zoom mode, the position of the zoom lens 112 is changed stepwise (i.e., changed to one of the discrete positions) according to the user's operation on the zoom lever 171 or the like. That is, in the step zoom mode, as denoted by the dashed line B of FIG. 4, the zoom lens 112 stops at one of predetermined positions (for example, at one of the positions P1 to P5)

Information of sets of stop positions of the zoom lens 112 in the step zoom mode is stored in the flash memory 156. In the step zoom mode, the digital camera 100 stops the zoom lens 112 at a stop position out of the stored set of stop positions. That enables the user to easily set the zoom magnification at a desired value.

Particularly, the digital camera 100 according to the present embodiment switches the stop position of the zoom lens in the "step zoom mode" according to the set aspect ratio of the image. The switching operation will be described below by using specific examples.

Figure 5A:
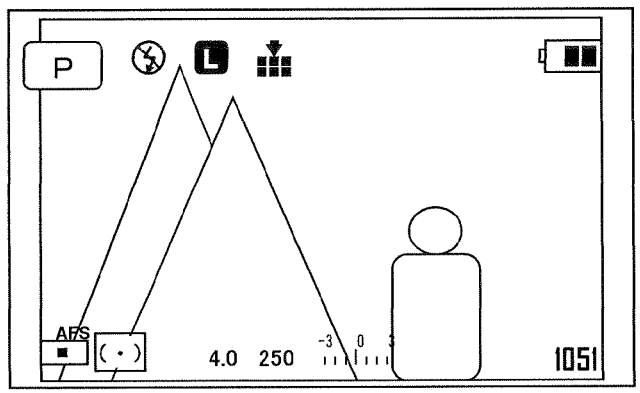
FIG. 5A is a first diagram illustrating content displayed on a liquid crystal display monitor under a zoom operation of the digital camera according to the present embodiment in a step zoom mode.
Figure 5B:
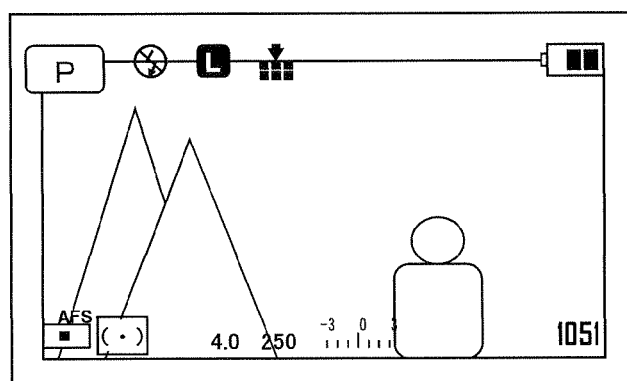
FIG. 5B is a second diagram illustrating content displayed on the liquid crystal display monitor under the zoom operation of the digital camera according to the present embodiment in the step zoom mode.
Figure 5C:
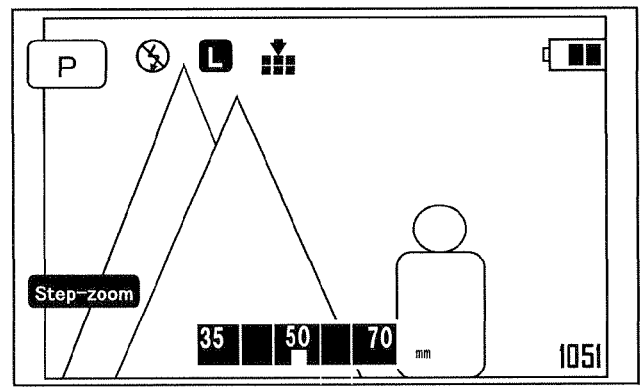
FIG. 5C is a third diagram illustrating content displayed on the liquid crystal display monitor under the zoom operation of the digital camera according to the present embodiment in the step zoom mode.
Figure 5D:
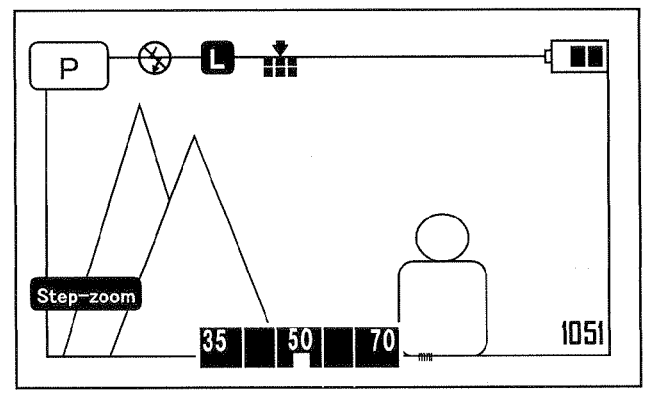
FIG. 5D is a fourth diagram illustrating content displayed on the liquid crystal display monitor under the zoom operation of the digital camera according to the present embodiment in the step zoom mode.

FIGS. 5A to 5D are diagrams illustrating content displayed on the liquid crystal display monitor 163 under the zoom operation in the step zoom mode of the digital camera 100 according to the present embodiment. FIGS. 5A and 5B are diagrams illustrating content displayed on the liquid crystal display monitor 163 of the digital camera 100 which is not performing the zoom operation (i.e., in a normal mode). FIGS. 5C and 5D are diagrams illustrating content displayed on the liquid crystal display monitor 163 of the digital camera 100 performing the zoom operation. FIGS. 5A and 5C are diagrams illustrating content displayed on the liquid crystal display monitor 163 for shooting the image with the aspect ratio of 4:3. FIGS. 5B and 5D are diagrams illustrating content displayed on the liquid crystal display monitor 163 for shooting the image with the aspect ratio of 16:9.

When the zoom lever 171 is operated by the user, the camera controller 153 sends a control signal to the zoom lens driver 113 to move the zoom lens 112, while changing the content displayed on the liquid crystal display monitor 163 from the content displayed as illustrated in FIG. 5A to the content displayed as illustrated in FIG. 5C or from the content displayed as illustrated in FIG. 5B to the content displayed as illustrated in FIG. 5D. FIGS. 5C and 5D illustrate content displayed on the liquid crystal display monitor 163 when the digital camera 100 is performing the zoom operation. In the present embodiment, the current focal length of the lens is displayed in the 35 mm equivalent focal length in the lower part of the display screen as illustrated in FIG. 5C and FIG. 5D.

While the zoom lever 171 is being operated, the camera controller 153 keeps outputting a control signal to the zoom lens driver 113. When detecting that the operation of the zoom lever 171 is stopped, the camera controller 153 decides the stop position of the zoom lens 112 to the nearest stop position in the moving direction of the zoom lens 112 out of the predetermined stop positions of the zoom lens 112. Here, the predetermined sets of stop positions of the zoom lens 112 are stored in the flash memory 156 as described above. When the zoom lens 112 is driven to the decided stop position, the camera controller 153 stops sending the control signal to the zoom lens driver 113.

In deciding the stop position of the zoom lens 112, the camera controller 153 changes the predetermined set of stop positions of the zoom lens 112 according to the set aspect ratio of the captured image.

Figure 6:
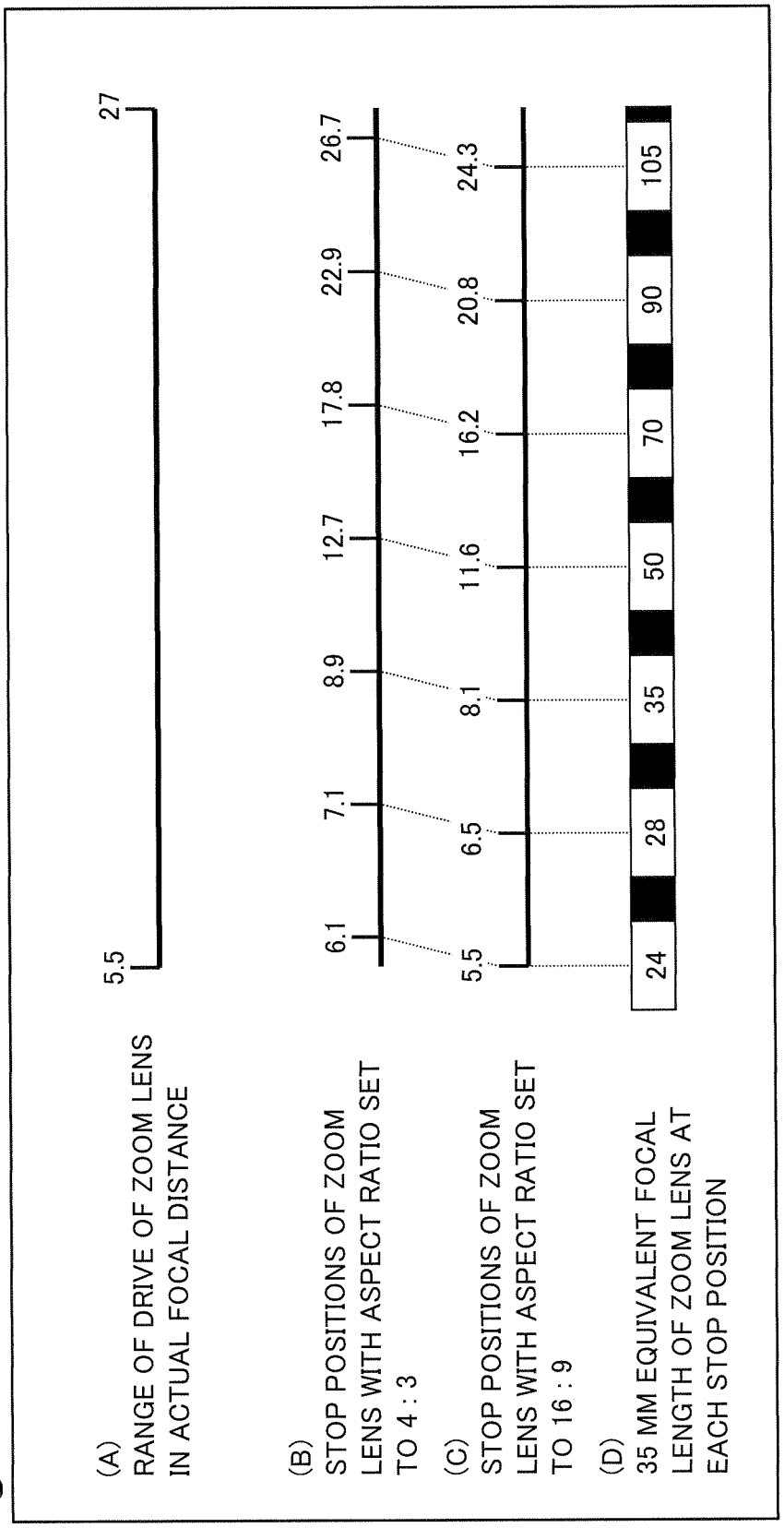
FIG. 6 is a diagram for describing a stop position of a zoom lens under an operation of the digital camera according to the present embodiment in the step zoom mode.

FIG. 6 is a diagram illustrating a range of driving the zoom lens 112 and the stop positions of the zoom lens 112 in the step zoom mode. Portion (A) illustrates the available range of driving the zoom lens 112 in the actual focal length. In the digital camera 100 according to the present embodiment, the actual focal length available for the zoom lens 112 is between 5.5 mm to 27 mm.

Portion (B) is a diagram illustrating (a set of) stop positions of the zoom lens 112 (hereinafter, also referred to as "zoom stop positions") in the step zoom mode for capturing an image with the aspect ratio of 4:3 using the zoom lens 112 of the available driving range illustrated in portion (A) is. The zoom stop positions are indicated with the focal length. The discrete positions are predefined as the zoom stop positions for capturing the image with the aspect ratio of 4:3.

Portion (C) is a diagram illustrating (a set of) zoom stop positions for capturing an image with the aspect ratio of 16:9. The discrete positions are predefined as the zoom stop positions for capturing the image with the aspect ratio of 16:9.

Portion (D) is a diagram illustrating the 35 mm equivalent focal length of the zoom lens 112 to be displayed on the liquid crystal display monitor 163 when the zoom lens 112 is stopped at the corresponding focal length illustrated in portions (B) or (C).

As illustrated in portions (B) and (C), the stop positions of the zoom lens 112 in the step zoom operation differ between that for the aspect ratio of 4:3 and that for the aspect ratio of 16:9. However, the 35 mm equivalent focal lengths in the respective cases are substantially same.

For example, the 35 mm equivalent focal length is 24 mm for both the actual focal length 6.1 mm for the aspect ratio of 4:3 and the actual focal length 5.5 mm for the aspect ratio of 16:9.

That is, by switching the set of zoom stop positions of the zoom lens 112 according to the aspect ratio of the captured image, the zoom lens 112 is stopped, in both aspect ratios, at the same position which is represented by the 35 mm equivalent focal length. Conversely, in the present embodiment, the set of the zoom stop positions of the zoom lens 112 for capturing an image with each aspect ratio in the step zoom operation is changed to make the 35 mm equivalent focal length of the zoom lens 112 substantially same between the case of capturing the image with the aspect ratio 4:3 and the case of capturing the image with the aspect ratio of 16:9.

As a result, even though the step zoom operation is performed while the current zoom position is displayed on the liquid crystal display monitor 163 in the 35 mm equivalent focal length, the stop position of the zoom lens to be displayed is the same regardless of the setting of the aspect ratio of the captured image.

2. Operation 2-1. Zoom Operation of Digital Camera

Figure 7:
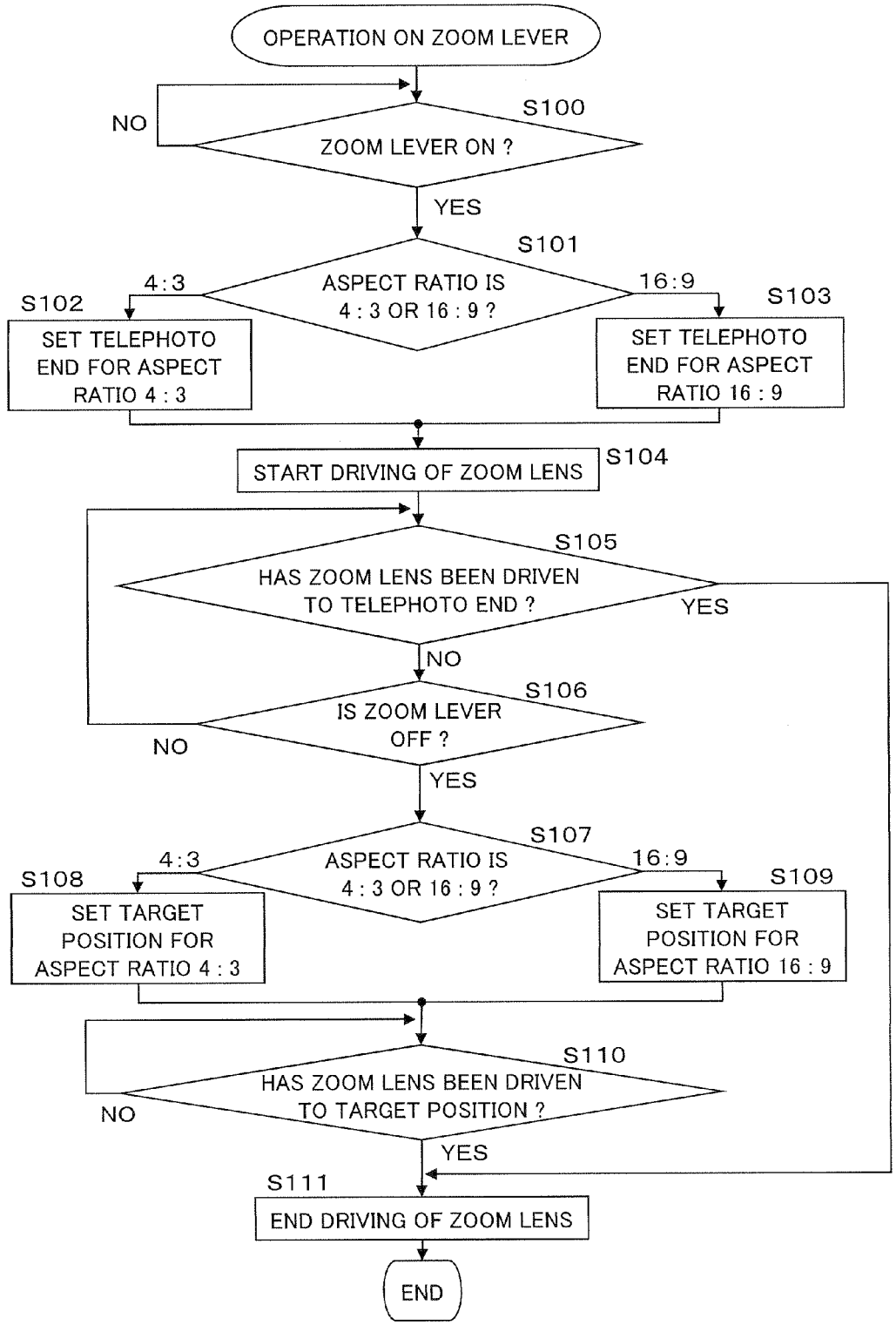
FIG. 7 is a flow chart for describing a control on the zoom lens under the operation of the digital camera according to the present embodiment in the step zoom mode.

A series of operations of the digital camera 100 associated with the step zoom will be described below. FIG. 7 is a flow chart for describing a zoom operation of the digital camera 100 in the step zoom mode when the user of the digital camera 100 moves the zoom lever 171 to the telephoto end (in the direction of increasing the focal length).

Note that the operation of the digital camera 100 in the case where the user moves the zoom lever 171 to the wide-angle end (in the direction of decreasing the focal length) is the same as that with the zoom lever 171 moved to the telephoto end except for the zoom direction. Therefore, only the zoom operation of the digital camera 100 performed when the zoom lever 171 is moved to the telephoto end will be described below.

The camera controller 153 determines whether the zoom lever 171 is moved or not, i.e., whether the zoom lever 171 is turned on or not in the normal state (the state in which the zoom operation is not performed) (S100).

When the zoom lever 171 is operated by the user (YES in step S100), the camera controller 153 starts the zoom operation. First, the camera controller 153 reads out information on the current aspect ratio of the captured image from the flash memory 156, and determines whether the current aspect ratio of the captured image is 4:3 or 16:9 (S101).

Then, when the aspect ratio of 4:3 is set, the camera controller 153 sets the telephoto end stop position which is the final stop position of the zoom lens 112 to the stop position of the zoom lens 112 for the aspect ratio of 4:3 (26.7 mm in FIG. 6(B)) (S102).

On the other hand, when the aspect ratio of 16:9 is set, the camera controller 153 sets the telephoto end stop position which is the final stop position of the zoom lens 112 to the stop position of the zoom lens 112 for the aspect ratio of 16:9 (24.3 mm in FIG. 6(C)) (S103).

Next, the camera controller 153 sends a control signal to the zoom lens driver 113 to drive the zoom lens 112 according to the operated direction of the zoom lever 171 (S104).

Then, the camera controller 153 determines whether the zoom lens 112 has reached the set telephoto end stop position while driving the zoom lens 112 (S105)

When the zoom lens 112 has reached the telephoto end stop position (YES in step S105), the camera controller 153 stops sending of the control signal to the zoom lens driver 113 to cause the zoom lens driver 113 to stop the zoom lens 112. As a result, the zoom operation ends (S111).

On the other hand, when the zoom lens 112 has not reached the telephoto end stop position (NO in step S105), the camera controller 153 determines whether the operation on the zoom lever 171 is stopped or not, i.e., whether the zoom lever 171 is off or not (S106).

When the operation on the zoom lever 117 is not stopped (NO in step S106), the camera controller 153 continues sending the driving signal to the zoom lens driver 113.

When the operation on the zoom lever 171 is stopped (YES in step S106), the camera controller 153 determines whether the aspect ratio of the captured image is 4:3 or 16:9 (S107).

When the aspect ratio of 4:3 is set, the camera controller 153 sets, as the target position of the zoom lens 112, the nearest stop position in the moving direction of the zoom lens 112 out of the set of stop positions of the zoom lens 112 for the aspect ratio of 4:3 (S108).

On the other hand, when the shooting mode with the aspect ratio of 16:9 is set, the camera controller 153 sets, as the target position of the zoom lens 112, the nearest stop position in the moving direction of the zoom lens 112 out of the set of stop positions of the zoom lens 112 for the aspect ratio of 16:9 (S109).

Then, the camera controller 153 determines whether the zoom lens 112 has been driven to the set target position or not (Silo).

When the zoom lens 112 has not yet reached the target position (NO in step Silo), the camera controller 153 continues sending the driving signal to the zoom lens driver 113.

When the zoom lens 112 has reached the set target position (YES in step S110), the camera controller 153 stops sending the control signal to the zoom lens driver 113 to cause the zoom lens driver 113 to stop the zoom lens 112. As a result, the zoom operation ends (S111).

As described above, the digital camera 100 according to the present embodiment switches the zoom stop position for step zoom according to the aspect ratio of the captured image. As a result, the zoom lens 112 stops at the same position in the 35 mm equivalent focal length in both cases where the aspect ratio of the image is 4:3 and where the aspect ratio of the image is 16:9.

Therefore, as illustrated in FIG. 5C and FIG. 5D, even though the step zoom operation is performed while the current zoom position is displayed on the liquid crystal display monitor 163 in the 35 mm equivalent focal length, the displayed value of the stop position of the zoom lens is the same regardless of the aspect ratio. Further, since the stop position by the step zoom operation is the same in the 35 mm equivalent focal length in both cases where the aspect ratio of the image is 4:3 and where the aspect ratio of the image is 16:9, the user can easily shoot the image by the same magnification without considering the aspect ratio.

3. Conclusion of Present Embodiment

The digital camera 100 according to the present embodiment includes the zoom lens 112, the zoom lever 171 that receives an operation for changing the magnification of the zoom lens 112, the CMOS image sensor 150 that generates image data based on a subject image formed via the zoom lens 112, the zoom lens driver 113 that moves the zoom lens 112 stepwise to one of predetermined stop positions corresponding to each of plurality steps according to the operation received by the zoom lever 171, and the camera controller 153 that controls the zoom lens driver 113. The camera controller 153 changes the stop position of the zoom lens 112 at each step according to the size of the image capturing area 202 on which the image data is generated in the CMOS image sensor 150 so that a converted focal length at the stop position of the zoom lens 112 at each step is the same regardless of the size of an image capturing area 202. The converted focal length is a focal length of the zoom lens 112 which is obtained by converting an actual focal length of the zoom lens 112 based on a predetermined basis.

The digital camera 100 according to the present embodiment with the above described configuration changes the stop position of the zoom lens 112 at each step according to the size of the image capturing area 202 on which the image data is generated in the CMOS image sensor 150 so that a converted focal length at the stop position of the zoom lens 112 at each step is the same regardless of the size of the image capturing area 202. As a result, the digital camera 100 can suppress changing of the converted focal length even though the size of the image capturing area 202 is changed according to changing of the shooting setting or the shooting mode. Therefore, the digital camera 100 allows a user to shoot an image at the same converted focal length, improving convenience of the user.

4. Other Embodiments

The idea of the above described embodiment is not limited to the embodiment described above. Various embodiments may also be considered. Other embodiments to which the idea of the above described embodiment can be applied will be described below.

The camera controller 153 according to the present embodiment is described to switch the set of stop positions of the zoom lens 112 in the step zoom mode according to the aspect ratio of the image capturing area. However, the idea of the above described embodiment is not limited to that. The camera controller 153 may switch the set of stop positions according to the size of the image capturing area (or the length of the diagonal of the image capturing area). Here, the size of the image capturing area is the vertical length or the horizontal length of the image capturing area.

Figure 8A:
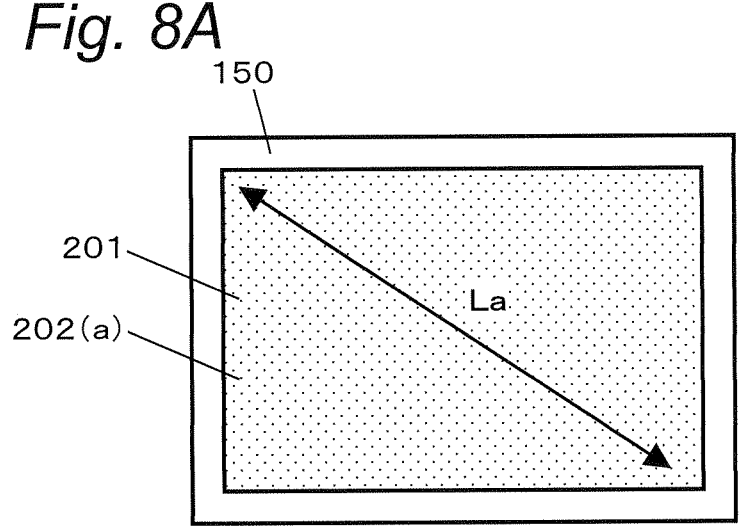
FIG. 8A is a first diagram for describing another example of changing the size of an image capturing area.
Figure 8B:
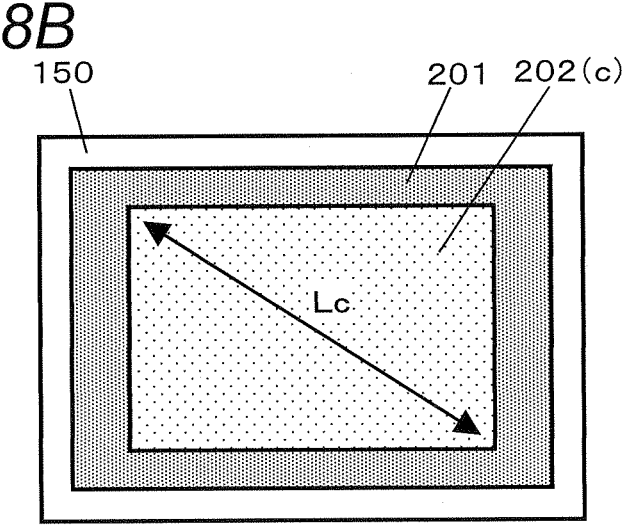
FIG. 8B is a second diagram for describing another example of changing the size of the image capturing area.

FIG. 8A and FIG. 8B are diagrams for describing changing of the size of the image capturing area. When the image capturing area 202 (a) illustrated in FIG. 8A is changed to the image capturing area 202 (c) illustrated in FIG. 8B, the angle of view of the subject image captured in the image capturing area changes. The features of the present embodiment can be applied to the case where the size of the image capturing area is changed and accordingly the angle of view of the subject is changed as in the above described case.

A specific example of a shooting mode which changes the size of the image capturing area will be described below.

Generally, camera shake correction techniques optically correct the camera shake by moving a lens or an image sensor on a plane perpendicular to the optical axis according to the camera shake. In contrast, an electronic camera shake correction technique electronically corrects the camera shake by moving an image capturing area on an image sensor (i.e., a region of segmented image) according to the camera shake. In the electronic camera shake correction technique, the image capturing area is reduced to be smaller than an effective pixel area of an image sensor and the reduced image capturing area is moved according to the camera shake, thus correcting the camera shake. As a result, the mode of performing the electronic camera shake correction has smaller size of the image capturing area (i.e., has a smaller angle of view) than that of the mode of not performing the electronic camera shake correction. Therefore, the above-described embodiment can be also applied to this kind of case. That is, the stop positions of the zoom lens in the step zoom operation set in the mode of performing the electronic camera shake correction may differ from that set in the mode of not performing the electronic camera shake correction.

Also when the camera shake correction is performed in shooting the night view, the size of the image capturing area may be changed in some cases. For example, in the night view mode described in US2012/0188410A (the contents of which are incorporated herein by reference), image data of smaller angle of view than those in other modes such as the portrait mode and the landscape mode is continuously segmented. The continuous segments of image data are compared with each other and the camera shake amount is calculated. Then, based on the calculated camera shake amount, the camera shake is corrected. The features of the present embodiment can be applied to the above described case because the image capturing area is switched and the angle of view is changed between the night view mode and the other modes.

Accordingly, an imaging apparatus according to various embodiments includes an input portion 160, 170, 171, and 162 receiving user input instructions for performing a zoom operation and setting the imaging apparatus to one of first and second operating modes. The first and second operating modes have different region sizes of an imaging unit on which image data is generated. For example, the operating modes can be different aspect ratios as discussed above. The imaging apparatus further includes a controller 153 electrically coupled to the input portion and a memory 155 and 156 electrically coupled to the controller. The memory includes first zoom lens stop positions associated with the first operating mode and second zoom lens stop positions associated with the second operating mode, the first zoom lens stop positions and the second zoom lens stop positions being defined to be equivalent to a predetermined standard (such as the 35 mm equivalent focal length). The memory further includes instructions for configuring the controller 153 to generate drive signals to be sent to a zoom lens driver 113 for driving a zoom lens 112 to one of the first and second zoom lens stop positions based upon which of the first and second operating modes the imaging apparatus is set. In view of the above, the digital camera 100 may be configured as below. The digital camera 100 may include the zoom lens 112, the zoom lever 171 that receives an operation for changing the magnification of the zoom lens 112, the CMOS image sensor 150 that generates image data based on a subject image formed via the zoom lens 112, the zoom lens driver 113 that moves the zoom lens 112 stepwise to a predetermined stop position corresponding to each of plurality steps according to the operation received by the zoom lever 171, and the camera controller 153 that controls the zoom lens driver 113. The camera controller 153 may have a first shooting mode (for example, night view mode) and a second shooting mode (for example, mode other than the night view mode) in which the size of a region of the CMOS image sensor 150 on which the image data is generated differs from that of the first shooting mode. The camera controller 153 may change the stop position of the zoom lens 112 at each step according to the shooting mode so that the converted focal length at the stop position of the zoom lens 112 at each step is the same regardless of the shooting mode. The converted focal length is a focal length of the zoom lens 112 which is obtained by converting an actual focal length of the zoom lens 112 based on a predetermined basis.

The features of the present embodiment can also be applied to the case in which the size of the image capturing area, i.e., the angle of view of the image capturing area is changed between the moving image shooting mode and the still image shooting mode.

As described above, the features of the present embodiment can be applied to various cases in which the size of the image capturing area, i.e., the angle of view of the image capturing area is changed according to the shooting mode.

Further, there is a technique for switching the field of view rate of the captured image displayed on the di splay device (the size of the displayed region of the image) between the moving image shooting mode and the still image shooting mode. For example, JP2006-229690A (the contents of which are incorporated herein by reference) describes a technique for decreasing the field of view rate of the captured image displayed on the display device in the moving image shooting mode than in the still image shooting mode. The features of the present embodiment can be also applied to that kind of case.

The embodiments have been described above as examples of the art of the present disclosure. For this purpose, the detailed description and the attached drawings have been disclosed. Therefore, some of the elements described in the detailed description and shown in the attached drawings may be unnecessary. The unnecessary element should not be considered as a necessary element merely because it is described in the detailed description and shown in the attached drawings.

Further, the above described embodiments exemplify the art of the present disclosure. Therefore, The above described embodiments can be subject to various changes, substitutions, addition, omission and/or the like without departing from the scope of the claims and the their equivalent.

Industrial Applicability

The embodiments of the present disclosure are not limited to be applied to the digital camera. That is, the embodiments of the present disclosure can be also applied to imaging apparatus or the like such as a movie camera and a phone with a camera which can change the size of the image capturing area.

What is claimed is:

1. An imaging apparatus comprising:
a zoom lens;
an operation unit that receives an operation for changing a magnification of the zoom lens;
an imaging unit that generates image data based on a subject image formed via the zoom lens;
a driver that moves the zoom lens stepwise to one of predetermined stop positions corresponding to each of a plurality steps according to the operation received by the operation unit; and
a controller that controls the driver, wherein
the controller changes the stop position of the zoom lens at each step according to a size of a region of the imaging unit on which the image data is generated so that a converted focal length at the stop position of the zoom lens at each step is the same regardless of the size of the region, and
the converted focal length is a focal length of the zoom lens obtained by converting an actual focal length of the zoom lens based on a predetermined basis.

2. The imaging apparatus according to claim 1, wherein the controller changes the stop position of the zoom lens at each step according to a length of a diagonal of the region so that the converted focal length at the stop position of the zoom lens at each step is the same regardless of the length of the diagonal of the region.

3. The imaging apparatus according to claim 1, wherein the controller changes the stop position of the zoom lens at each step according to an aspect ratio of the region so that the converted focal length at the stop position of the zoom lens at each step is the same regardless of the aspect ratio of the region.

4. The imaging apparatus according to claim 1, wherein the controller is configured to have:
a first zoom mode for changing the magnification of the zoom lens stepwise according to the operation received by the operation unit; and
a second zoom mode for continuously changing the magnification of the zoom lens according to the operation received by the operation unit, and
in the first zoom mode, the controller changes the stop position of the zoom lens according to the size of the region so that the same converted focal length is obtained regardless of the size of the region.

5. The imaging apparatus according to claim 1, wherein the converted focal length is a 35 mm equivalent focal length.

6. The imaging apparatus according to claim 1, further comprising a display unit that displays the converted focal length.

7. An imaging apparatus comprising:
a zoom lens;
an operation unit that receives an operation for changing a magnification of the zoom lens;
an imaging unit that generates image data based on a subject image formed via the zoom lens;
a driver that moves the zoom lens stepwise to one of predetermined stop positions corresponding to each of a plurality of steps according to the operation received by the operation unit; and
a controller that controls the driver, wherein
the controller has a first shooting mode and a second shooting mode in which the size of a region of the imaging unit on which the image data is generated differs from that of the first shooting mode,
the controller changes the stop position of the zoom lens at each step according to the shooting mode so that a converted focal length at the stop position of the zoom lens at each step is the same regardless of the shooting mode, and
the converted focal length is a focal length of the zoom lens which is obtained by converting an actual focal length of the zoom lens based on a predetermined basis.

8. The imaging apparatus according to claim 7, wherein the region of the first shooting mode is smaller than that of the second shooting mode.

9. The imaging apparatus according to claim 7, wherein the first shooting mode is a mode for electronically correcting camera shake by moving the region.

10. An imaging apparatus comprising:
an input portion receiving user input instructions for performing a zoom operation and setting the imaging apparatus to one of first and second operating modes, the first and second operating modes having different region sizes of an imaging unit on which image data is generated;
a controller electrically coupled to the input portion; and
a memory electrically coupled to the controller, the memory including first zoom lens stop positions associated with the first operating mode and second zoom lens stop positions associated with the second operating mode, the first zoom lens stop positions and the second zoom lens stop positions being defined to be equivalent to a predetermined standard, the memory further including instructions for configuring the controller to generate drive signals for driving a zoom lens to one of the first and second zoom lens stop positions based upon which of the first and second operating modes the imaging apparatus is set.

* * * * *